May 9, 1967     C. L. LEVY     3,318,631

AUTOMOTIVE SIGNAL DEVICE

Filed Aug. 9, 1965

CAROL L. LEVY
*INVENTOR.*

BY
*Martin R. Levy*
/AGENT 3,318,631
AUTOMOTIVE SIGNAL DEVICE
Carol L. Levy, New Castle, Del.
(111 Robert Lane, Greenville, Del. 19807)
Filed Aug. 9, 1965, Ser. No. 478,378
1 Claim. (Cl. 296—1)

This invention relates to visual signalling means for vehicles located at an elevated position on said vehicles. More specifically, it relates to a device for signalling drivers of other vehicles not directly and immediately behind the vehicle having this device.

It is known to place domed warning lights on top of vehicles to indicate an emergency vehicle having the right of way on the highway. British Patent 761,721, granted Nov. 21, 1956 discloses a safety signal for motor vehicles which comprises a bright blue light on the roof of such vehicle. U.S. Patent 2,205,169, granted June 18, 1940 discloses a signal light housing mounted on top of an automobile having portions indicating stop, right turn, and left turn. It is also known to place an auxiliary light in the rear window of a vehicle.

While prior art devices have been directed toward enhanced signal visibility, it is clear that they are directed toward signalling the driver next behind the signalling vehicle. It is also apparent that such devices were intended as auxiliary devices. Where such devices are external to the vehicle no provision is made for keeping them visible in foul weather. The prior art device to be mounted inside the vehicle could not be large enough without obstructing driver vision to be a reliable signal to a driver many vehicles behind the one signalling.

With the advent of high speed motor vehicle travel on congested roads, the danger of high speed multi-car collisions is enhanced, because a vehicle following a queue of other vehicles must quickly respond to the actions of the lead driver without ever being directly signalled from that driver as to his intentions and is even often unaware of the lead driver's presence. Similarly, large trucks often are not aware of the presence of small cars such as small sports cars, ahead of them on the road. The cab of a large truck is elevated and the light projecting rearward of the small car are not easily visible to the truck driver. Often, when there is a queue of vehicles, only by a relay of signals down the string of traffic, does a driver many vehicles behind the lead driver know what action on his part is called for. The time it takes for the signal to reach the last driver in the line incorporates all the reaction times of the intermediate drivers. This extra time may be the difference between an avoidable accident and an unavoidable accident.

A similar problem occurs at night on high speed congested roads. The driver's visual "blind spot" at the adjacent lane parallel to his rear fender is well known. A driver may pull out to pass the vehicle in front of him unaware of the close proximity of the vehicle in his "blind spot" whose headlights have merged with others on the road and therefore do not provide a satisfactory indication of proximity.

It is an object of this invention to provide a visual signalling device for directly signalling to vehicles many vehicles behind in a string of traffic, said signal being visible through the windows of the intervening vehicles without impairing visibility of the signalling vehicle. It is a further object to provide such a signalling device which is fully operative and visible in inclement weather. It is still a further object to provide a signalling device from which a signal is visible from the top and sides of the vehicle.

This invention is, in a vehicle, an improvement in a visual signalling device connected to said vehicle, and preferably integrally connected thereto, said improvement characterized by having in specific geometric relationship the vehicle rear window assembly, the vehicle body, and the housing of the vehicle signalling device, said geometry defined by having the housing bounded on at least one side by the rear window assembly and on at least one side by the vehicle body. In a preferred embodiment the roof of the vehicle overhangs and extends outward beyond the outer boundary of the housing and the housing is bounded by the roof and the window. It is preferred that the housing or housings be symmetrically located about the longitudinal axis of the vehicle. In another embodiment the housing is located such that the signal emitted therefrom is visible when observed from the side of the vehicle. In still another embodiment the housing projects a signal which is visible from above the vehicle. In a most highly preferred embodiment, the housing and the rear window are so positioned as to project the signal on to the rear window and cause it to reflect rearward of the vehicle from said window. In a typical geometry the housing is located at least partly under the roof of the vehicle hwich overhangs the rear window and directly above the rear window, the rear window being disposed at an angle less than 90° to the roof as viewed from the rear of the vehicle.

By vehicle is meant the total conveying device including but not limited to a conveying device with all customary appurtenances commonly associated therewith and all systems necessary for the vehicle to function. By vehicle signalling device is meant all systems necessary to receive and transfer the input stimulus and transform it to a signal. By housing is meant the translucent cover protecting the signal emitter but through which the signal is visible. In all cases where the word housing is used it is understood that the signal emitter is located as to transmit a signal visible through said housing. The scope of this invention is not limited to devices with a separate housing and for purposes of this invention it is to be understood that the housing may be integral with the signal emitter.

This invention is further explained with reference to the drawings.

Figure 1:
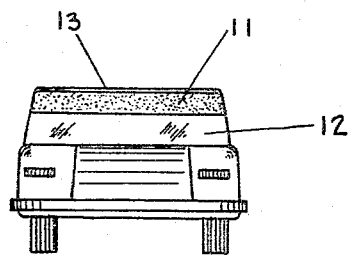
FIGURE 1 shows a rear view of a vehicle with this invention.

In FIGURE 1, the signal housing 11 is bounded on one side by the rear window 12 and on the other by the vehicle roof 13.

Figure 2:
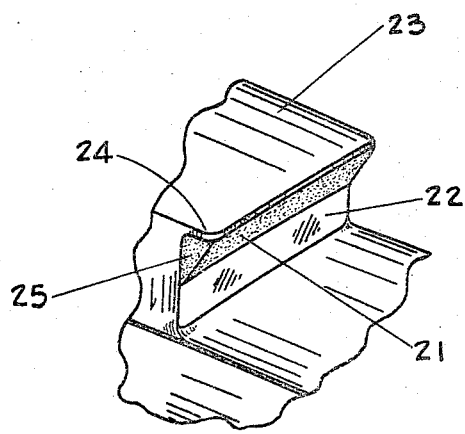
FIGURE 2 shows the rear view of a vehicle having the preferred embodiment wherein from the same housing the visual signal is visible from the side of the vehicle.

In FIGURE 2 a signal housing 21 completely across the rear window 22 is bounded by the rear window 22 on one side and the roof 23 on the other side. In this embodiment the housing is under the roof overhang 24 and as such extends around the sides of the vehicle 25. This figure shows the embodiment wherein the cross section of the housing is triangular in shape showing a triangular signal on the sides of the vehicle 25 and causing a reflection off the rear window 22 due to the projection of the signal on to that window through the housing face 21.

Figure 3:
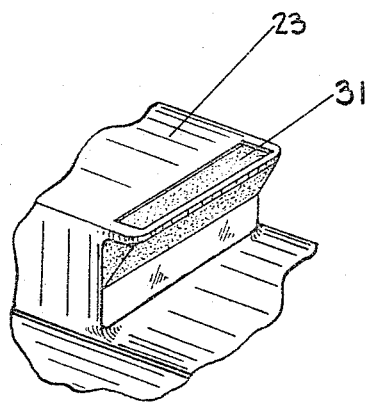
FIGURE 3 shows the embodiment wherein the signal is visible from the rear sides and top of the vehicle.

FIGURE 3 shows the signal housing of FIGURE 2 in combination with a new housing face 31 projecting upward through the roof 23. The housing 31 is essentially flush with the roof and the signal emitting device is projecting a signal through all the housing faces simultaneously.

Figure 4:
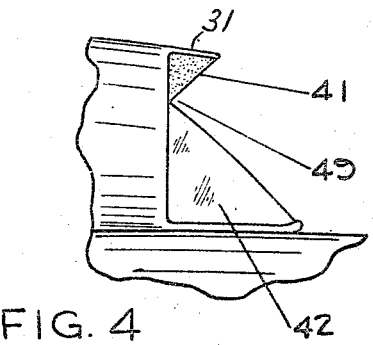
FIGURE 4 shows the highly preferred embodiment wherein the rear window is a reflector for the signal.

In FIGURE 4, the window 42 is disposed at an acute angle 49 to the vehicle roof 43 and the housing 41 emits a signal which is reflected from the rear window 42 and thus projected rearward. The housing also has a face 31, as in FIG. 3, in a position normally occupied by the roof of the vehicle so that a signal may be projected upwards of the vehicle.

The placement of the housing is critical to this invention and many advantages are gained thereby. By placing the signal housing around the rear window it is visible through the windows of intervening vehicles by a driver of a vehicle many vehicles removed. Furthermore this visibility is accomplished without obscuring rear view vision of the signalling vehicle because it does not block the rear window. The signal emitted is directly in the field of vision of drivers behind the signalling vehicle.

Placing the housing above the window but under the roof overhang has special advantages:

In the first place the roof overhang protects the housing from being obscured by snow and dirt and other foul weather. Secondly, in this embodiment it is easy to provide for the signal to be viewed from the side. The major advantage, however, is that the signal may be magnified by its reflection from the rear window. The rear window in this embodiment may become a reflector taking on the color of the housing and making the signal all the more apparent. This is especially true where the cross-section of the housing and the geometry of the window are such as in FIGURE 4.

This invention also comprehends embodiments wherein more than one housing may be so positioned with relation to the car window and body. It is also further understood that the housing may be of any suitable color, preferably red, and the signal emitted may denote any intended action of the signalling vehicle including its very presence.

By providing such unique geometry, visual signals of vehicles will now be apparent to other than just vehicles directly behind the signalling vehicle. As an added advantage, small rear-end collisions will not break the housing of these signals because the housing will be above the collision region. By locating the housing above the window and under the roof, the signal will be more apparent due to its reflection off the rear window.

It is understood that many embodiments not herein specifically described are within the spirit and scope of this invention and this invention is limited only by the following claim.

I claim:

In a vehicle having a rear window, roof, and visual signalling device, an improvement to enhance signal visibility characterized in that the roof overhangs the rear window directly above said rear window, the rear window is disposed at an angle of less than 90° to the roof overhang, and a housing of the visual signalling device is integrally connected to the roof overhang and is located at least in part under the roof overhang, said housing extending to the sides of the vehicle and occupying at least in part a position normally occupied by the roof of the vehicle, said specific interconnected geometric relationship permitting a signal to be projected to the sides and upwards of the vehicle while simultaneously permitting a signal to be projected on to the rear window of the vehicle causing it to reflect from the rear window rearwards of the vehicle.

References Cited by the Examiner

UNITED STATES PATENTS 26,730   1/1860   Allison _____ 240—7.25

BENJAMIN HERSH, *Primary Examiner.*

P. GOODMAN, *Assistant Examiner.*